March 31, 1970     R. W. WILSON     3,503,137
AUTOMATIC TOBACCO CURING APPARATUS
Original Filed Dec. 14, 1966     6 Sheets-Sheet 1
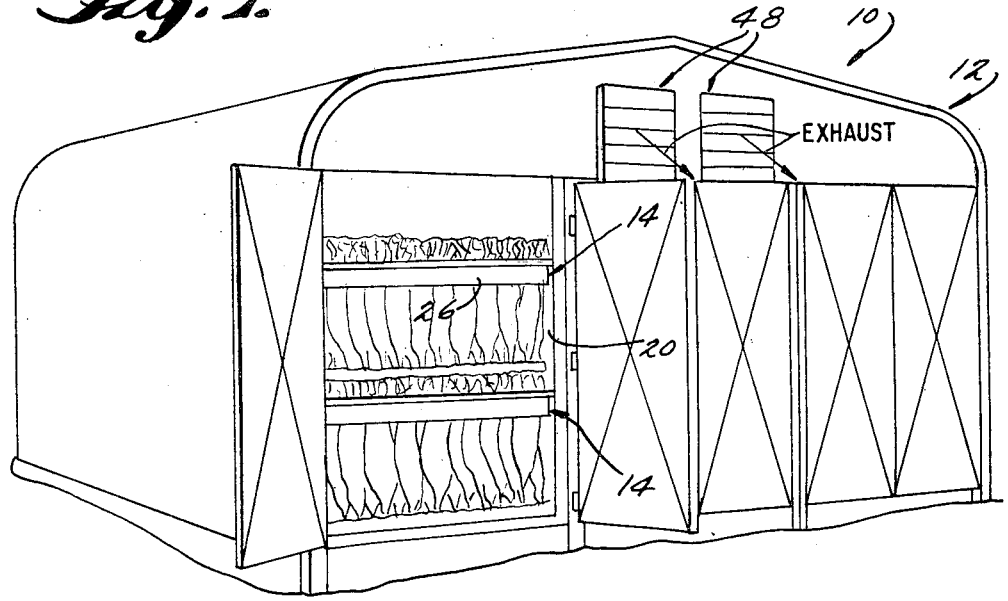
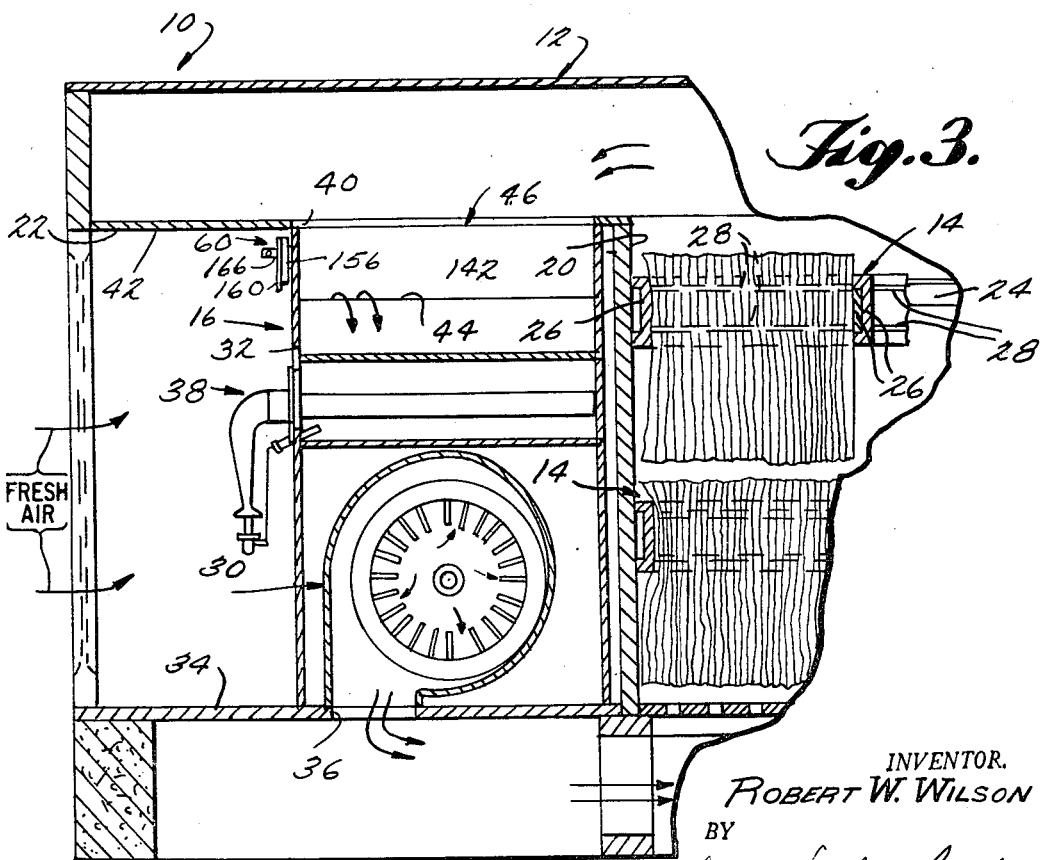
INVENTOR.
ROBERT W. WILSON
BY
Cushman, Darby & Cushman
ATTORNEYS March 31, 1970  R. W. WILSON  3,503,137
AUTOMATIC TOBACCO CURING APPARATUS
Original Filed Dec. 14, 1966  6 Sheets-Sheet 2
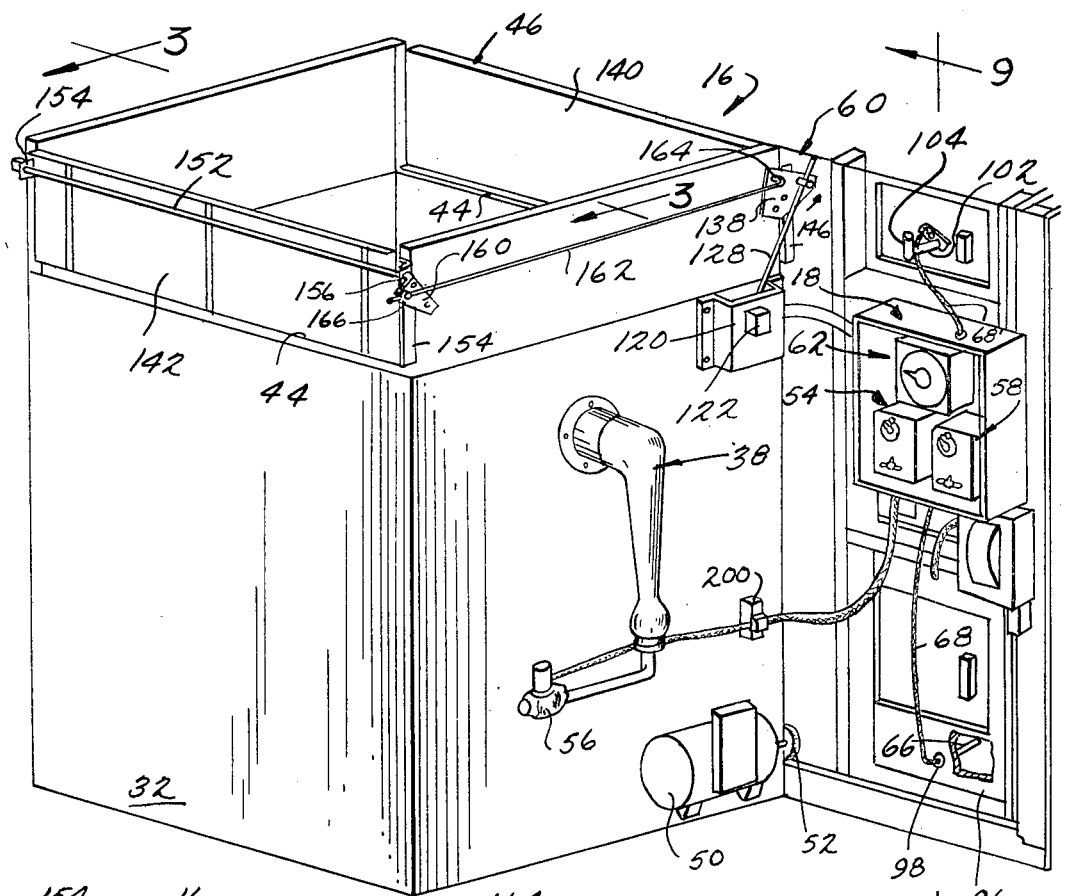
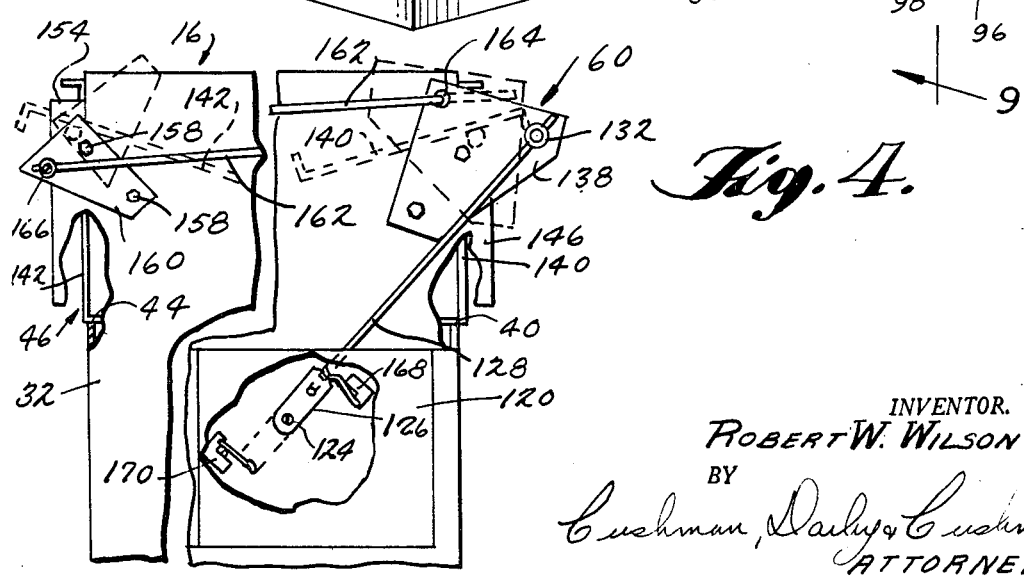
INVENTOR.
ROBERT W. WILSON
BY
Cushman, Darby & Cushman
ATTORNEYS

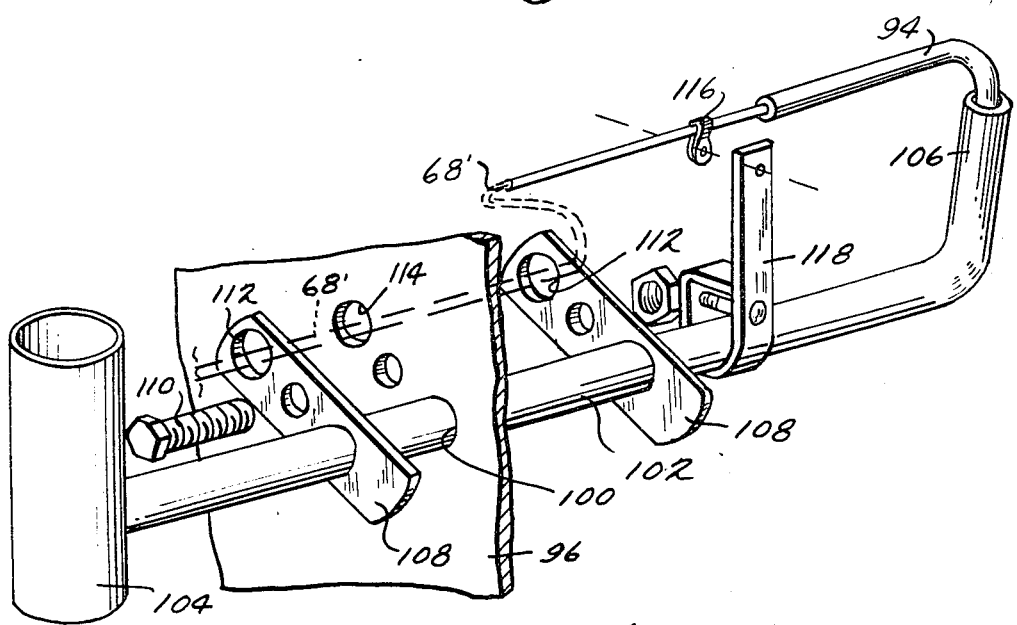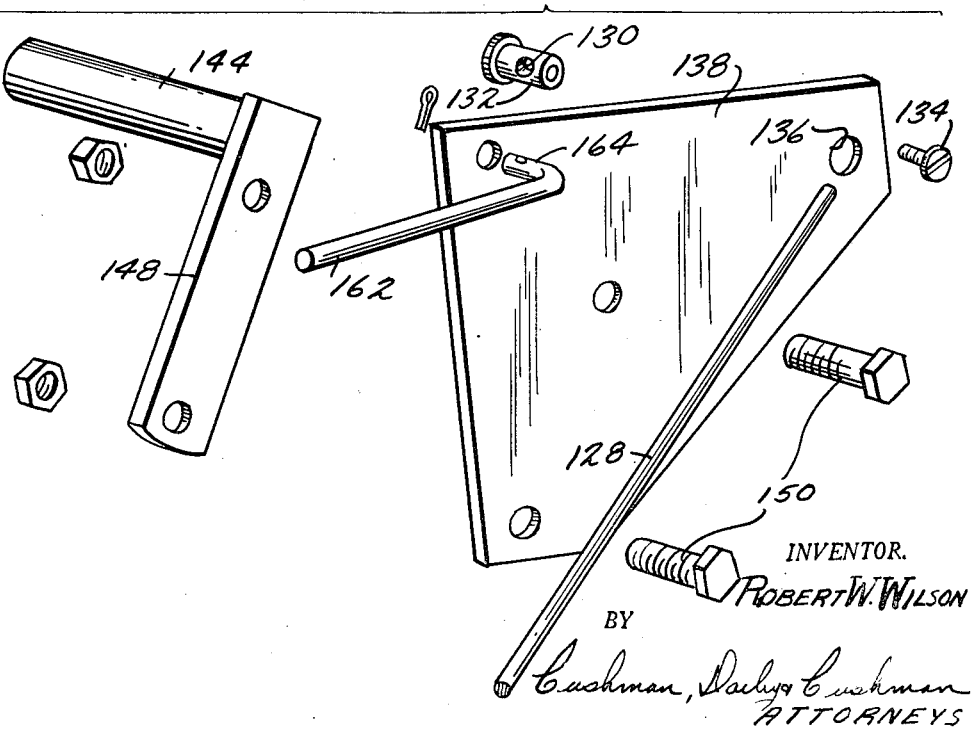

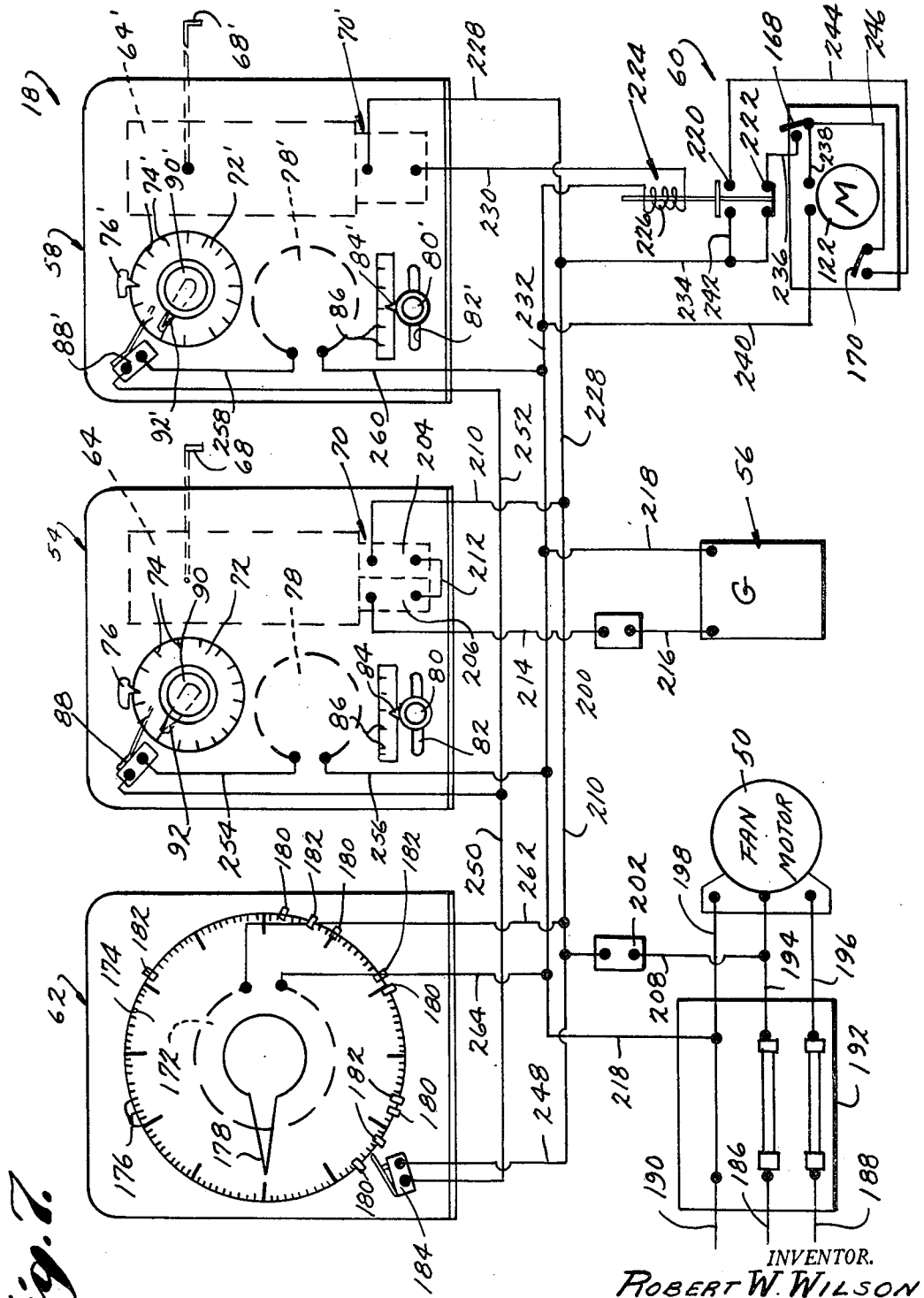

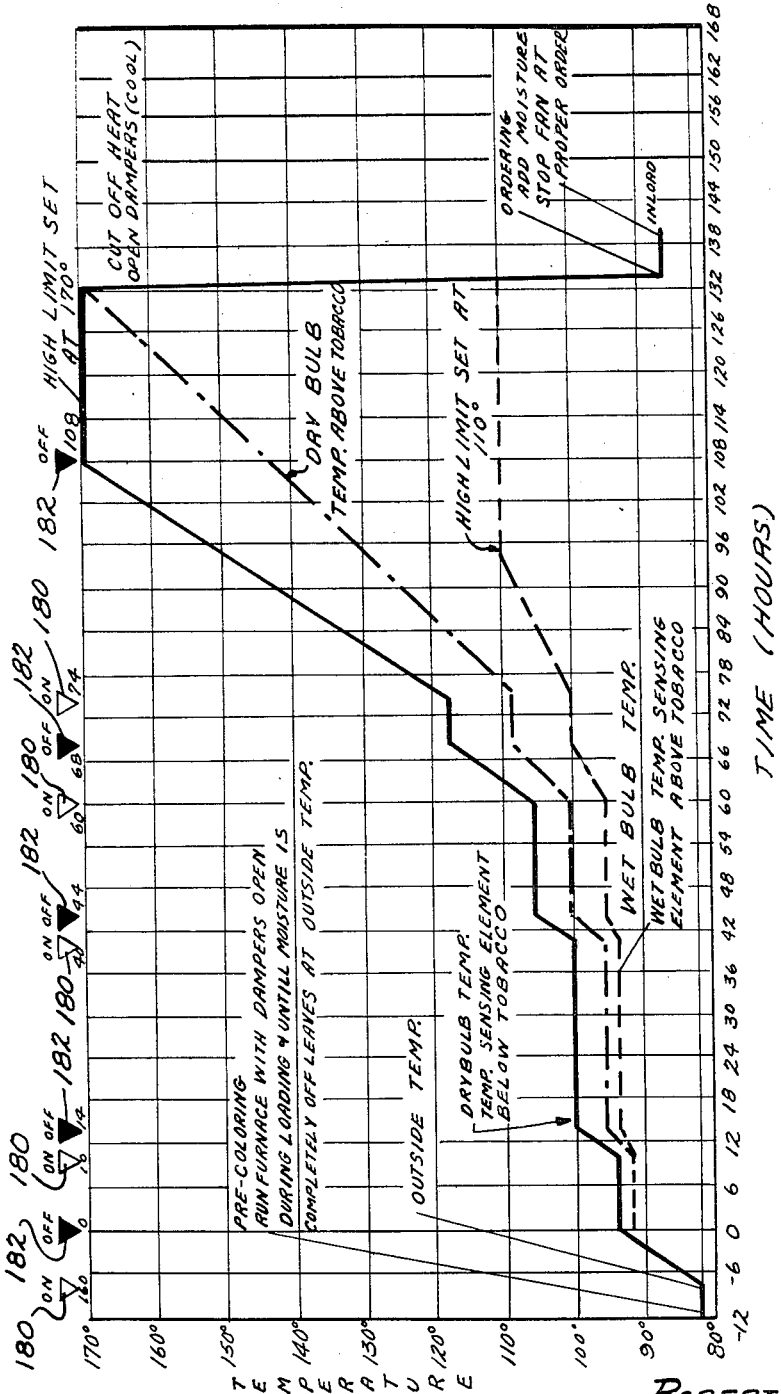

March 31, 1970    R. W. WILSON    3,503,137
AUTOMATIC TOBACCO CURING APPARATUS
Original Filed Dec. 14, 1966    6 Sheets-Sheet 6

INVENTOR
ROBERT W. WILSON
BY Cushman, Darby & Cushman
ATTORNEYS

United States Patent Office                                    3,503,137
                                                                                   Patented Mar. 31, 1970

3,503,137
AUTOMATIC TOBACCO CURING APPARATUS
Robert W. Wilson, Charlotte, N.C., assignor to R. H. Bouligny, Inc., Charlotte, N.C., a corporation of North Carolina
Continuation of abandoned application Ser. No. 601,634, Dec. 14, 1966. This application Dec. 18, 1968, Ser. No. 785,865
Int. Cl. F26b *19/00;* A24b *3/04;* G05d *22/02*
U.S. Cl. 34—45                                             27 Claims

ABSTRACT OF THE DISCLOSURE

A bulk curing tobacco barn including a plurality of bulk curing racks for supporting a multiplicity of tobacco leaves in a compact bed within a controlled flow of air, a fan for establishing and maintaining a forced flow of air in a circulating path through the bed of leaves supported by the bulk curing racks, a heater for applying heat to the air in the path, a damper for admitting fresh air to the flow path and for discharging heated air from the path, and a control system for automatically operating the heater and damper through a curing cycle which includes coloring or yellowing of the leaves, drying the leaves, and drying the stems of the tobacco supported within the barn by the bulk curing racks. The control includes a thermostat for operating the heater in response to temperature conditions of the air in the flow path and a mechanism for advancing the thermostat at an adjustable predetermined rate, and a mechanism for effecting movement of the damper to control the humidity of the air in the flow path in response to the sensing of a condition of the heated air flowing in the path indicative of relative humidity and a timer for advancing the temperature and humidity controls throughout the curing procedure including the yellowing of the leaves, drying of the leaves and drying of the stems.

---

This application constitutes a continuation of application Ser. No. 601,634 dated Dec. 14, 1966, now abandoned.

This invention relates to tobacco curing and more particularly to apparatus for curing tobacco embodying a temperature, relative humidity, and time responsive automatic control whereby substantially the entire curing process can be carried out automatically in accordance with a preselected program.

The present invention has particular applicability to the recently developed bulk curing procedures, such as disclosed in Hassler Patent No. 3,110,326, dated Nov. 12, 1963. In the tobacco curing method described in the Hassler patent, the tobacco leaves are supported within the barn within bulk curing racks, each being capable of supporting a multiplicity of leaves in compressed, contiguous relation with their flat surfaces extending generally vertically.

This manner of supporting the tobacco leaves in a bulk condition for curing is basically distinguished from the prior procedures which have, since the utilization of bulk curing, become known as "conventional" procedures. In conventional curing the leaves are supported in individual groups or hands comprising three to eight leaves. Each hand is usually supported by tying the butt ends of the leaves of the hand together with a string and supporting successive interconnected hands on an elongated tobacco stick. The sticks with the tobacco hands mounted thereon are then supported within the barn in vertically and horizontally spaced relation.

A characteristic of conventional curing, as distinguished from bulk curing, is that the individual groups of leaves are discretely supported within the barn so as to have a relatively free access to curing air within the barn. With such free access, a proper amount of heat for effecting the various steps in the curing process can be supplied to the air within the barn by simple burners which serve to heat the air in the barn and establish a natural convection current from the bottom of the barn, through the leaves, and out of the top of the barn.

With the advent of bulk curing, involving as it does the support of a multiplicity of leaves in relatively compact contiguous relation, it is necessary to provide for the forced flow of air through the compact, bulk mass of leaves in order to bring into contact with all of the leaves sufficient air to effect cure.

It has been found that an ancillary advantage to the provision of a forced air circulating mechanism is that a more accurate and immediate control over the curing air conditions can be achieved. The systems heretofore provided, for example, as shown in Hassler Patent No. 3,110,326, include a furnace housing having a heating unit therein for applying heat to the air passing within the furnace housing and a fan mechanism within the housing for establishing and maintaining a flow of air from the inlet of the housing, past the heating means, and out of the outlet of the housing. The inlet and outlet of the housing are connected respectively to the upper and lower portions of the tobacco receiving chambers or compartments of the barn. These chambers receive one or more tiers of bulk curing racks which, when properly loaded with tobacco leaves, provide one or more compact beds of leaves which extend across and completely fill the tobacco receiving compartments. With this arrangement, heated air is forced into the tobacco compartments of the barn below the beds of leaves so as to pass upwardly therethrough, the air in the upper portion of the barn being recirculated through the housing by way of the inlet thereof. The arrangement also includes damper means for controlling the introduction of outside air into the path of heated air circulating through the tobacco receiving compartments of the barn and the furnace housing. The damper arrangement is also operable to effect a discharge of air in the circulating flow commensurate with the amount of fresh outside air which is introduced.

Concurrently with the recognition of the advantages of more accurate and instantaneous air control resulting from the forced air systems utilized with bulk curing, a renewed interest in the provision of forced air circulating systems in conventional curing has taken place. For example, there has been developed a control mechanism which has been used recently to some extent in forced flow systems for conventional curing operable to effect an automatic advance of a thermostatic control at a predetermined rate until a predetermined desired temperature is obtained. With the use of a control mechanism of this type, for example, as disclosed in Flegel Patent No. 3,203,-265, dated Aug. 31, 1965, a measure of automatic control in each of the three primary steps in the curing process can be obtained.

The curing of tobacco whether performed in the conventional manner or by the bulk curing procedures as disclosed in the aforesaid Hassler patent, involves three basic steps: (1) coloring or yellowing of the leaves; (2) drying the leaves; and (3) drying the stems. In each of these steps during the initial part of the entire time interval within which the step is accomplished, the temperature of the air which effects the curing step must be increased. Thus, with the use of a control mechanism of the type disclosed in the aforesaid Flegel patent, the operator can set the controls at the beginning of each major step and the mechanism will serve to automatically advance the thermostatic control so that the temperature of the curing air will be increased from its initial value to a final desired value at which it is to be maintained during the remaining time interval of the step. The control mechanism of the Flegel patent provides means whereby the rate of temperature advance can be varied.

At best, a control mechanism of this type eliminates the necessity of the operator to effect a manual advance of the thermostatic control during the first portion of each of the three basic steps. The attention of the operator is required at the end of each step, since the control will continue to operate the thermostat at the maximum temperature setting indefinitely until the operator manually resets the mechanism at the end of each step, preparatory to the commencement of the next step. Moreover, a control mechanism of this type is effective to regulate only the temperature conditions of the curing air. It is still necessary for the operator to manually control the humidity conditions of the air which vitiates to some extent the overall convenience provided so that the operator must still provide a measure of continuous attention to the system.

An object of the present invention is the provision of a forced air system for bulk tobacco curing barns embodying automatic control means which provides for the automatic control not only of the temperature conditions of the curing air but the humidity conditions and time conditions as well, so as to truly alleviate the necessity of the operator to provide personal attention to the system throughout the curing process including the three main steps of yellowing, leaf drying and stem drying.

Another object of the present invention is the provision of apparatus of the type described which provides for complete flexibility in the preselection by the operator of desired temperature, humidity and time conditions throughout the entire curing process prior to the commencement of the curing operation. With the present system, the operator may preselect any desired curing program varying as to air temperature, air humidity and time, and the entire curing process including yellowing, leaf drying, and stem drying will be carried out automatically in accordance with the preselected program without the necessity of personal attention by the operator.

A further object of the present invention is the provision of apparatus of the type described having improved temperature, relative humidity, and time responsive automatic control means for establishing in continuous sequence, low temperature and high relative humidity conditions in the circulating air contacting the leaves to be cured for an interval sufficient to yellow the leaves, intermediate temperature and relative humidity conditions in the circulating air contacting the leaves to be cured for a time interval sufficient to dry the leaves, and high temperature and low relative humidity conditions in the circulating air contacting the leaves to be cured for a time interval sufficient to dry the stems of the leaves.

A further object of the present invention is the provision of apparatus having temperature, relative humidity and time responsive automatic control means of the type described providing for the automatic control of the temperature and relative humidity conditions of the curing air in relation to time to automatically carry out the yellowing, leaf drying, and stem drying steps of the curing process in which any desired rate of change of the temperature and relative humidity conditions per unit of time may be preselected, and any desired time interval within which the temperature and humidity conditions are either changed or maintained at a constant level may be preselected.

A further object of the present invention is the provision of an apparatus of the type described having improved means for automatically controlling the relative humidity conditions of the curing air.

Still another object of the present invention is the provision of apparatus having relative humidity automatic control means of the type described which is effective to control the relative humidity of the curing air so as to vary the same at predetermined time intervals through the yellowing, leaf drying, and the stem drying steps of the curing process.

Still another object of the present invention is the provision of apparatus having temperature automatic control means of the type described which is effective to control the temperature of the curing air so as to vary the same at predetermined time intervals through the yellowing, leaf drying, and the stem drying steps of the curing process.

A still further object of the present invention is the provision of an automatic control means of the type described which is simple in construction, effective in operation and economical to manufacture and maintain.

These and other objects of the present invention will become more apparent during the course of the following detailed description and appended claims.

The invention may best be understood with reference to the accompanying drawings wherein an illustrative embodiment is shown.

In the drawings:

FIGURE 1 is a perspective view of a tobacco curing apparatus embodying the principles of the present invention;

FIGURE 2 is a fragmentary perspective view of the furnace housing and automatic control mechanism of the present invention;

FIGURE 3 is a fragmentary sectional view taken along the line 3—3 of FIGURE 2;

FIGURE 4 is an enlarged fragmentary front elevational view of the damper moving mechanism of the present invention;

FIGURE 5 is an enlarged fragmentary exploded perspective view of a portion of the damper moving mechanism shown in FIGURE 4;

FIGURE 6 is a view similar to FIGURE 5 showing the manner in which the sensing means of the automatic control mechanism is mounted within the curing barn;

FIGURE 7 is a schematic wiring diagram of the electrical circuit of the automatic control mechanism;

FIGURE 8 is a graph illustrating the wet bulb and dry bulb temperatures of the curing air in relation to time for a suggested curing program carried out by the apparatus of the present invention.

Figure 9:
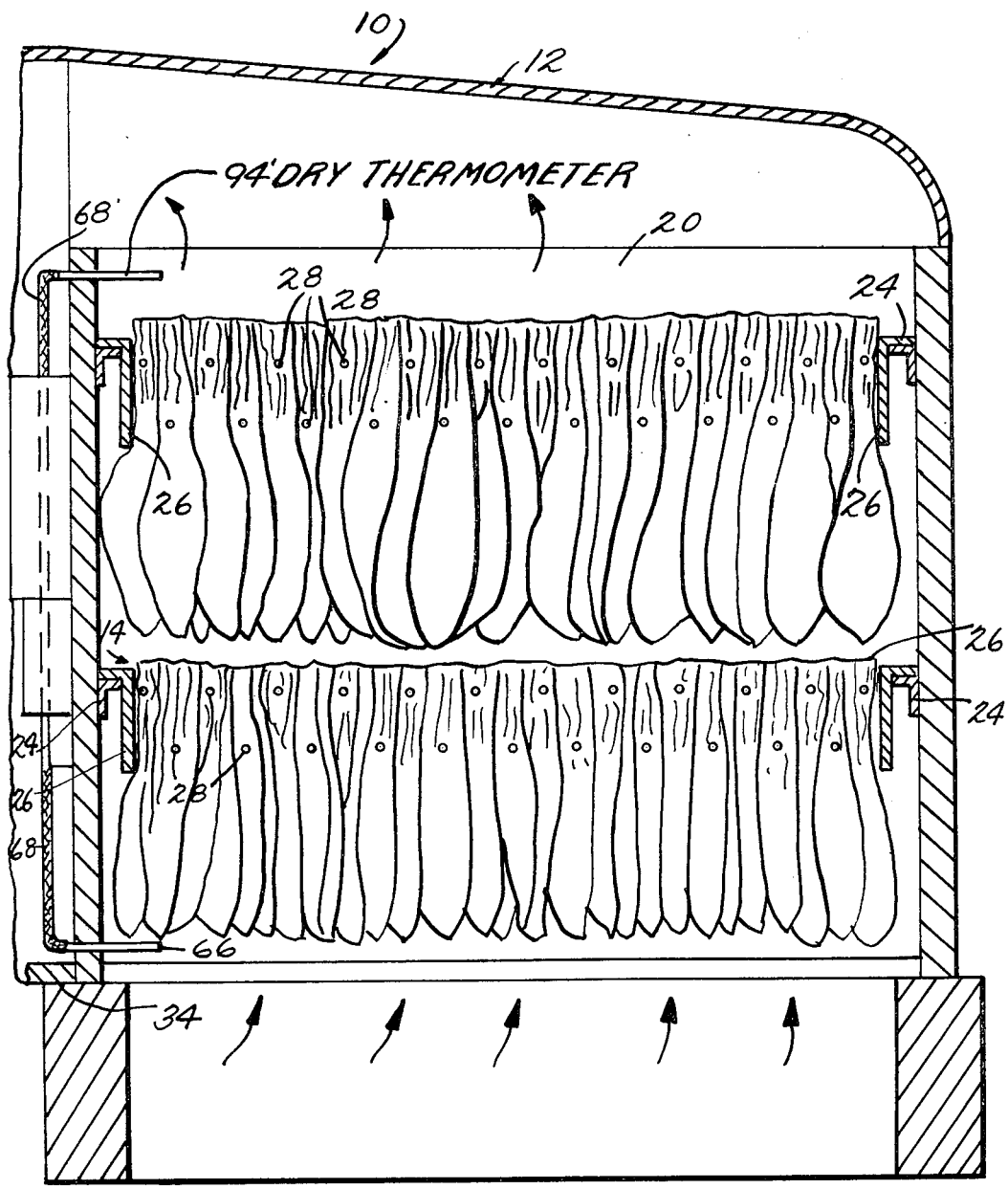
FIGURE 9 is a sectional view taken substantially along the line 9—9 of FIGURE 2, showing a modified form of the relative humidity sensing element.

Referring now more particularly to the drawings, there is shown in FIGURE 1 a bulk tobacco curing apparatus, generally indicated at 10, embodying the principles of the present invention. In general, the apparatus 10 includes a curing barn structure, generally indicated at 12, constructed in accordance with the teachings of the aforesaid Hassler Patent No. 3,110,326, the disclosure of which is hereby incorporated by reference into this specification, and in accordance with the teachings of Wilson Patent No. 3,134,583, dated May 26, 1964, the disclosure of which is hereby incorporated by reference into the present specification. The curing barn structure 12 is adapted to receive and support a plurality of bulk curing racks, generally indicated at 14, constructed in accordance with the aforesaid Wilson Patent No. 3,134,583, and in accordance with the teachings of Wilson Patent No. 3,244,445, dated Apr. 5, 1966, the disclosure of which is hereby incorporated by reference into the specification. As stated in the aforesaid Wilson and Hassler patents, each of the bulk curing racks 14 is operable to support a multiplicity of tobacco leaves within the barn structure 12 for curing by the passage of curing air vertically therethrough.

To this end, the apparatus 10 of the present invention also includes a furnace unit, generally indicated at 16, constructed in accordance with the teachings of Wilson Patent No. 3,134,583, which is operable to establish forced flow of heated air upwardly through the leaves carried by the bulk curing racks 14 within the curing barn 12 to effect cure of the leaves.

The apparatus 10 of the present invention also includes as an important part thereof a temperature, humidity, and time responsive automatic control mechanism, generally indicated at 18, which is operable to automatically control the operation of the furnace unit 16 in accordance with a preselected curing program to vary the temperature and relative humidity conditions of the curing air at predetermined times to perform in continuous sequence the basic steps of the curing process including the yellowing of the leaves, the drying of the leaves, and the drying of the stems.

The principles of the present invention can be adequately understood without a description of the details of the curing barn structure 12. Reference may be had to the aforesaid Hassler Patent No. 3,110,326, and Wilson Patent No. 3,134,583, for these details. For present purposes, it is important merely to note that the curing barn structure provides one or more curing compartments 20, there being three such compartments provided in the barn structure shown in FIGURE 1. The three curing compartments 20 are disposed in side-by-side relation with the outermost compartments extending the full depth of the barn structure and the central compartment being of lesser length so as to provide a furnace area, generally indicated at 22 in FIGURE 3, disposed rearwardly of the central compartment and between the rear end portions of the outer compartments within which the furnace unit 16 is mounted.

Each of the curing compartments 20 is provided with rack supporting rails 24 which, as shown, are disposed in two vertically spaced, horizontally aligned pairs on opposite sides of each compartment.

Each horizontally aligned pair of rails 24 slidably receive and support a plurality of bulk curing racks 14. Here again, the details of construction of the bulk curing racks 14 need not be described in order to understand the principles of the present invention. References may be had to the disclosures contained in the aforesaid Wilson patents for these details. For present purposes, it is sufficient to indicate that each rack includes a pair of complementary rack sections 26 separable to permit the loading of a multiplicity of tobacco leaves therebetween, and movable together to retain the loaded leaves therein. Each rack also includes a plurality of elongated spikes or prongs 28 which serve to pierce the tobacco leaves when the rack sections are moved together and to provide for interior support of the multiplicity of leaves secured within the rack during curing. The rack sections provide for peripheral support of the multiplicity of leaves when the rack sections are secured together, such peripheral support retaining the leaves together in an initially compressed condition in the manner described in the aforesaid Hassler patent.

The racks are of a size complementary to the curing chambers 20 so that when a plurality of such racks are supported on the rails 24 within each curing compartment 20, the leaves to be cured are supported for curing in two vertically spaced compact beds of leaves which uniformly fill the curing compartment in such a way as to insure that the curing air will pass through the leaves of the beds in series.

The compact condition of the leaves requires a forced flow of air therethrough in order to insure contact of the curing air with each leaf within the beds. To this end, the furnace unit 16 is provided with fan means 30 for the purpose of establishing such forced flow of curing air. As shown, the fan means is of the axial intake, radial outlet type and is mounted in the bottom portion of a rectangular housing 32 of the furnace unit 16. As best shown in FIGURE 3, the furnace area 22 is provided with a floor 34 having an outlet opening 36 formed therein to which the outlet of the fan 30 is communicated.

It will be understood that the fan means 30 is of a width substantially less than the width of the housing 32 so that both ends of the fan means provide the axial inlet thereof. Disposed above the fan means 30 within the housing 32 is a heating means, generally indicated at 38, for applying heat to the curing air. The heating means 38 may either be oil fired or gas fired, reference being had to the aforesaid Wilson Patent No. 3,134,583, for the details of construction thereof. The upper end of the housing 32 is open and communicates with an inlet openings 40 formed in a ceiling 42 defining the upper portion of the furnace area 22. Just below the inlet of the housing the sides thereof are cut out to form fresh air inlet openings 44 which are controlled by damper means, generally indicated at 46.

The fan means 30 of the furnace unit 16 thus establishes a flow of forced air from the inlet 40 or the fresh air openings 44 (if the damper means 46 is in an open position), through the housing 32, past the heating means 38 and outwardly through the outlet 36. From the outlet 36 curing air flows to the bottom of the curing chambers and passes upwardly through the beds of leaves supported therein. Preferably, for the purpose of permitting selective operation of one or more of the curing compartments 20, while the remainder are inactive, separate dampers (not shown) may be provided to control the flow of air to the bottom portion of each curing compartment. The upper portions of the curing compartments are in communication with each other so that the air passing upwardly through the leaves in the operative compartments is recirculated back through the inlet.

It will be understood that when the damper means 46 is in a position to close the fresh air inlets 44, the fan means 30 will serve to establish flow of curing air through the curing compartments which is recirculated through the housing in an essentially closed path. When the damper means 46 is adjusted to permit the introduction of fresh air through the inlet openings 44, additional air is supplied to the system and for the purpose of permitting the discharge of a generally corresponding amount of air from the circulatory path, there is provided a pair of louver units 48 which form a part of the overall damper means for controlling the introduction and exhaust of air into and out of the circulatory path of flow.

As best shown in FIGURE 1, the louver units 48 are mounted in the front wall of the barn structure in communication with the upper portion of the barn. The units are of the type adapted to open outwardly in response to a predetermined air pressure in the upper portion of the barn structure. Thus, the louver units 48 will remain closed when the fresh air inlets are closed so that the entire system is effectively closed and the fan means will merely recirculate the contained air in the closed path. When fresh air is allowed to be introduced through the inlet openings 44, the pressure will build up in the upper portion of the barn structure resulting in the exhaust of air in the circulatory path of flow outwardly to the atmosphere through the louver units 48. The louver units thus serve to permit a discharge of air from the circulatory path commensurate with the amount of fresh air introduced to the circulatory path.

While the damper means described above is preferred, it will be understood that the essential characteristic for the control of relative humidity is to have a fresh air inlet opening and an outlet opening for the discharge of circulating air and a controllable damper unit associated with at least one of the openings. For example, louver unit 48 could simply be eliminated leaving the discharge outlet open or louver unit 48 could be controlled in lieu of damper means 46 and the latter could be either eliminated or replaced with a unit, such as louver unit 48.

In the bulk curing apparatus 10 of the present invention the fan means must be in operation at all times to insure an adequate supply of curing air to all of the compact beds of leaves supported within the barn structure 12. Thus, there is provided an electric motor 50 which is drivingly connected with the shaft of the fan motor, as by a belt and pulley assembly 52. The automatic control mechanism 18 of the present invention is not adapted to effect the operation of the fan motor 50 since the latter is adapted to be operated continuously throughout the curing process. It will be understood, however, that in certain conventional curing installations where forced flow of air is not required at all times, the automatic control mechanism 18 may be utilized to control the operation of the fan motor.

The automatic control mechanism 18 comprises a temperature control unit, generally indicated at 54, operable to control the heating means 38 through a conventional solenoid actuated valve 56, a humidity control unit, generally indicated at 58, operable to control the damper means 46 through a moving mechanism, generally indicated at 60, and a timing unit 62 which is effective to control the operation of the temperature control unit 54 and the humidity control unit 58.

The temperature control unit 54 includes a thermostatic regulator 64 of any conventional construction of the type which is adapted to be actuated in response to a remote temperature sensing means such as a thermometer 66. As shown, the thermometer 66 is of usual dry bulb construction and is connected with the thermostatic regulator through a capillary tube 68. In accordance with conventional operation, the liquid within the dry bulb thermometer 66 and capillary tube 68 serves to effect movement of a diaphragm or the like which in turn is adapted to open a thermostatic switch means, generally indicated at 70, when the thermometer senses a predetermined temperature depending upon the setting of the thermostatic regulator 64, all in accordance with conventional practice.

The setting of the thermostatic regulator 64 is indicated on a movable dial 72 having indicia 74 along the periphery thereof. The setting of the dial 72 is indicated by a fixed pointer 76 which aligns with one of the corresponding temperature indicia 74. The control unit 54 is provided with means for advancing the setting of the dial 72 and hence, the desired temperature at which the thermostatic regulator 64 is operable to control the heating means 38 through the thermostatic switch means 70 and valve 56. Preferably, such means is adjustable so that the rate of advance of dial 72 can be varied.

An illustrative and preferred form of such means is disclosed in the aforesaid Flegel Patent No. 3,203,265, the disclosure of which is hereby incorporated by reference into this specification. A description of the details of the adjustable advancing means disclosed in the Flegel patent is not believed necessary to an understanding of the principles of the present invention. For present purposes, it is sufficient to indicate that there is provided an electric motor 78 which, when actuated, serves to effect an advancing movement of the dial 72. For the purpose of adjusting the rate of movement of the dial 72 in response to the actuation of the motor 78, there is provided an adjusting knob 80 which is selectively manually movable, as by horizontal sliding movement within a slot 82, into any one of a plurality of adjusted positions. The setting of the adjustment knob 80 is indicated by a pointer 84 thereon which aligns with one of a plurality of indicia 86.

The adjustable advancing means of the Flegel patent also includes a limit switch 88, for deactuating the motor 78 when the dial 72 has been advanced to a desired maximum setting. The desired maximum setting at which the limit switch is operable is determined by the setting of an adjustment knob 90 mounted concentric with the dial 72 for independent adjustment with respect thereto and for normal movement therewith. The setting of the adjustment knob 90 is determined by the alignment of a pointer 92 thereon with the temperature indicia 74 on the dial 72.

The relative humidity control unit 58 is sensitive to the relative humidity condition of the curing air and may embody any of the well-known instruments for measuring relative humidity conditions. As shown, the unit is operable to sense the wet bulb temperature of the curing air and therefore since the unit is temperature responsive, it is preferably of a construction similar to the unit 54. Thus, the relative humidity control unit 84 includes a wet bulb thermometer 94, rather than the dry bulb thermometer 66 as previously described in connection with the temperature control unit 54. Since the unit 58 is the same as the unit 54 except as hereinafter indicated, a detailed description of the unit 58 is not believed necessary and in the drawings corresponding parts have been indicated by corresponding prime numerals.

The manner of mounting the dry bulb thermometer 66 and wet bulb thermometer 94 within the curing barn is best shown in FIGURE 6. The dry bulb thermometer 66 must be located at a position within the path of flow of the curing air below the tobacco so that it will sense the dry bulb temperature condition of the air prior to passage through the tobacco leaves. In the embodiment shown, the dry bulb thermometer is positioned within the rear end portion of one of the outer curing compartments adjacent to the furnace area 22. A vertical wall 96 which divides the rear end portion of the curing compartment from the access area 22 is formed with an opening 98 disposed at a level adjacent the floor of the compartment through which the tube 68 associated with thermometer 66 extends, as shown in FIGURE 2.

The wet bulb thermometer 94 may be positioned with the path of flow of the curing air either below or above the tobacco as the reading will be substantially the same in either position. Preferably, the wet bulb thermometer is disposed above the tobacco by suitable means, as best shown in FIGURES 2 and 6.

Extending through an appropriate opening 100 formed in the upper portion of the wall 96 is a tubular member 102 having one end thereof communicating with an upright water container 104 and the opposite end thereof turned upwardly, as indicated at 106. The tubular member 102 is fixedly supported within the opening 100 in the wall 96, as by a pair of mounting plates 108 apertured to receive the tubular member and arranged to be disposed on opposite sides of the wall 96. Mounting plates 108 are secured together by any suitable means, such as a bolt assembly 110 extending through the wall 96. The mounting plates 108 are provided with aligned openings 112 which, when the plates are secured on opposite sides of the wall 96, align with an opening 114 therein. The aligned openings 112 and 114 provide a passage in the wall 96 of the curing compartment through which capillary tube 68' extends from the thermostatic regulator 64'.

The wet bulb thermometer 94 is mounted, as by a clip 116, on the upper end of an upright bracket 118 having its lower end secured to the portion of the tubular member 102 extending into the curing compartment. The wick portion of the wet bulb thermometer 94 extends into the upwardly extending free end portion of the tubular member 102. In this way, the wick of the wet bulb thermometer can be maintained in a saturated condition by maintaining a supply of water within the container 104 positioned within the furnace area 22.

Referring now more particularly to FIGURES 2, 4 and 5, the moving mechanism 60 for the damper means includes a flanged U-shaped frame 120 secured to the front wall of the furnace housing 32. Secured to the exterior surface of the frame 120 is an electrical motor 122 having an output shaft 124 which is driven through a suitable gear reduction mechanism (not shown). The output shaft 124 extends through the frame 120 and has a lever arm 126 fixedly secured to the free end thereof. The outer end portion of the arm 126 is provided with an aperture for receiving the bent end of an actuating rod 128, the opposite end of which is engaged within a transverse opening 130 formed in a pivot pin 132. The end of the actuating rod is secured within the opening 130 by any suitable means, such as a bolt 134 threadedly engaged within the end of the pivot pin 132 in engagement with the rod 128. The pivot pin 132 is rotatably mounted within an opening 136 formed in one corner of a generally triangularly-shaped plate 138.

The damper means 46 comprises a pair of damper members 140 and 142, the damper member 140 having a shaft 144 fixedly secured to the rear surface thereof at a position spaced slightly below the upper edge thereof. The ends of the shaft 144 are pivotally received within a pair of brackets 146, detachably fixedly mounted to the furnace housing at opposite ends of the adjacent inlet opening 44. The front extremity of the shaft 144 has one end of a mounting arm 148 fixedly secured thereto, as by welding or the like. The mounting arm and triangular plate 138 are provided with a plurality of aligned apertures for receiving fastening elements 150 which serve to detachably fixedly secure plate 138 with the damper member 140 so that pivotal movement of the plate 138 will effect a corresponding movement of the damper member 140.

The other damper member 142 likewise has a shaft 152 fixedly secured to the outer surface thereof, which shaft is rotatably supported at its ends by brackets 154, similar to the brackets 146 previously described. The front end of the shaft 152 has a mounting arm 156, similar to the arm 148, fixedly secured thereto, the arm 156 being detachably fixedly secured, as by bolts 158, to a generally triangularly-shaped plate 160. The plate 160, like the plate 138, is thus fixedly secured to the damper member 142 so as to move therewith. The plate 160 is moved with the plate 138 by means of a connecting rod 162 having one end thereof bent, as indicated at 164, for engagement within an aperture formed in the corner of the plate 138, and its opposite end engaged within a pivot pin member 166, similar to the pivot pin 132, rotatably carried by a corner of the plate 160.

It will be understood that energization of the motor 122 will thus effect a movement of the damper members 140 and 142 between the closed positions shown in solid lines in FIGURE 4 and the opened positions shown in dotted lines therein. The operation of the electric motor 122 is controlled by a pair of limit switches 168 and 170 carried by the frame 120 in a position to be engaged by the outer extremity of the actuating arm 126.

The timing unit 62 is made up of conventional components and includes an electric 7-day clock or timing mechanism 172 having a dial 174 connected therewith to be rotated by the timing mechanism 172 one revolution in one direction in a 7-day period and movable independently of the latter in the opposite direction so as to provide for a manual setting of the dial with respect to the timing mechanism. The dial 174 is provided with indicia 176 along its periphery, the indicia indicating hours from 0 to 168. A fixed pointer 178 extending horizontally from the center of the dial provides an indication of the curing time by virtue of its alignment with one of the indicia 176 of the dial.

The outer periphery of the dial 174 is formed to detachably receive in any position of adjustment therearound a plurality of on-trippers 180 and a plurality of off-trippers 182. The trippers are adapted to cooperate with an on-off switch mechanism 184, the on-trippers 180 serving to close the switch mechanism 184 and the off-trippers 182 serving to open the switch mechanism 184. The details of construction of the switch mechanism and the manner in which the trippers serve to open and close the same may be in accordance with Gallagher et al. Patent No. 2,671,830, issued Mar. 9, 1954, the disclosure of which is hereby incorporated by reference into this specification. For purposes of understanding the principles of the present invention it is sufficient to note that the switch mechanism 184 will be closed by the operation of the on-trippers 180 at a time corresponding with the position of the on-trippers on the dial as determined by the indicia 176 and, likewise, the switch mechanism will be opened by the operation of the off-trippers 182 at a time corresponding with the position of the off-trippers on the dial as determined by the indicia 176.

The manner in which the fan motor 50 is energized, the heating means valve 56 is operated by the temperature control unit 54, the damper means moving mechanism 60 is operated by the relative humidity control unit 58, and the manner in which both of the control units 54 and 58 are operated by the timing unit 62 is shown by the wiring diagram of FIGURE 7. The wiring diagram includes two main power lines 186 and 188 and a ground line 190 which lead to a main switch controlled fuse box 192. The fan motor 50, which preferably is of a three-wire type, is connected directly to the main switch controlled fuse box, as by lines 194, 196 and 198. The valve 56 may be of any conventional design and in the illustrative embodiment shown wherein the heating means is gas fired, the valve may be conveniently a solenoid actuated gas valve. The valve is connected across the power line 186 and ground line 190 in series with the thermostatic switch means 70 of the control unit 54 and in series with a sail switch 200 and a main safety switch 202.

As shown, the thermostatic switch means 70 comprises a pair of thermostatic switches 204 and 206, connected in series, each of the thermostatic switches preferably being of a type which open in response to an increase in temperature, the switch 206 being set to open at a temperature 5° above that at which the switch 204 is set to open. The switch 206, therefore, normally does not enter into the operation of the control unit 54, but is provided as an additional safety factor in the event that the switch 204 should malfunction and fail to open at its desired temperature.

The series circuit of the gas control valve 56 includes a lead 208 from the power line 186 to the safety switch 202, a lead 210 from the safety switch to one terminal of the thermostatic switch 204, a lead 212 from the other terminal of the thermostatic switch 204 to one terminal of the thermostatic switch 206, and a lead 214 from the other terminal of the thermostatic switch 206 to the sail switch 200. The sail switch 200 is of conventional design and includes a sail member (not shown) disposed within the flow of air within the furnace housing 32 so as to be maintained in an operative position by the flow of air. In the event that the flow of air should be halted, as, for example, by a breakage in the belt and pulley assembly 52, the sail member of the switch 200 will move into an inoperative position breaking the series circuit. Thus, in normal operation, the sail switch will be closed so that the circuit is completed by a lead 216 from the sail switch to the solenoid valve 56 and a lead 218 from the solenoid valve to the ground line 190. It will be noted that so long as the series circuit is closed, solenoid valve 56 will be energized to permit fuel to be fired in the heating means 38.

When the temperature sensed by the dry bulb thermometer 66 exceeds the desired operating temperature as determined by the setting of dial 72, thermostatic switch 70 will open, thus deenergizing the solenoid valve 56 and shutting off the flow of fuel to the heating means. When the temperature sensed by the dry bulb thermometer 66 reaches an incremental value below the desired operating temperature as determined by the setting of dial 72, thermostatic switch 204 closes thus energizing the solenoid valve 56 and permitting the heating means to fire.

The limit switches 168 and 170 are connected in parallel with the electric motor 122 of the damper means moving mechanism and in series with a pair of switch contacts 220 and 222 of a relay, generally indicated at 224. The relay 224 includes a coil 226 for controlling the switch contacts 220 and 222, the coil being connected in series with the thermostatic switch means 70′ of the control unit 58. As shown, the thermostatic switch 70', like the thermostatic switch 204, is of a type adapted to open in response to a heat rise. Thus, when the wet bulb temperature sensed by the wet bulb thermometer 94 is below the desired operating wet bulb temperature as determined by the setting of dial 72', a series circuit including thermostatic switch 70' and relay coil 226 is completed across the main power line 186 and main ground line 190, as by a lead 228 connected between the lead 210 and one contact of the thermostatic switch 70', a lead 230 from the other contact of the thermostatic switch 70' to one side of the coil, and a lead 232 connected between the other side of the coil and the lead 218. When the coil 226 is energized, switch contacts 222 will be closed providing a circuit through the limit switch 168 to energize the motor 122. This circuit is connected across the main lines 186 and 190 by means of a lead 234 connected between the lead 228 and one contact of the switch 222, a lead 236 from the other contact of the relay switch 222 to one contact of the limit switch 168, a lead 238 from the other contact of the limit switch 168 to the motor 122, and a lead 240 from the motor 122 to the ground lead 232.

It can be seen that when the coil 226 is energized, motor 122 will likewise be energized if the damper members are disposed in their open position, as shown in dotted lines in FIGURE 4, in which case the circuit is completed through the limiting switch 168. Energization of the motor 122 will effect a rotational movement of the shaft 124 which in turn will effect a 180° pivotal movement of the arm 126 at which point limit switch 168 is engaged and opened to interrupt the circuit to the motor. The damper members therefore will normally be maintained in the closed position, as shown in solid lines in FIGURE 4, so long as the thermostatic switch 70' is closed to complete the circuit energizing the coil 226.

When the wet bulb temperature sensed by the wet bulb thermometer 94 increases an incremental amount above the desired operating wet bulb temperature, as determined by the setting of the dial 72', thermostatic switch 70' will open thus interrupting the circuit to the relay coil 226 which closes the switch contacts 220 and opens the switch contacts 222. The closing of the switch contacts 220 completes a circuit through the limit switch 170 to the motor 122. This circuit is connected across the main power line 186 and ground line 190 through a lead 242 connected between the lead 234 and one contact of the relay switch 220, a lead 244 from the other contact of the switch 220 to one contact of the limit switch 170, and a lead 246 connected between the other contact of the limit switch 170 and the motor lead 238.

It will be understood that energization of the motor 122 will effect a 180° pivotal movement of the arm 126 from the solid line position, as shown in FIGURE 4, to the dotted line position at which point limit switch 170 is opened to deenergize the motor. In this way, the control unit 58 operates the damper means 46 through the mechanism 60 to introduce into or exclude fresh air from the curing air within the circulatory path so as to maintain a wet bulb temperature in the curing air substantially at a desired setting as determined by the dial 72'.

The setting of the dial 72 which determines the desired operating dry bulb temperature at which the actual operating dry bulb temperature is maintained by the control unit 54 through the operation of the valve 56 as aforesaid, and the setting of the dial 72' which determines the desired operating wet bulb temperature at which the actual operating wet bulb temperature is maintained by the control unit 58 through the operation of the moving mechanism 60, are advanced under the control of the timing unit 62. While it is within the contemplation of the present invention to provide a separate switch mechanism for each of the control units 54 and 58, in the preferred embodiment shown, the switch mechanism 184 serves to simultaneously control both the temperature control unit and the relative humidity control unit and is therefore connected in series with two parallel circuits, one containing the motor 78 and switch 88 in series, and the other containing the motor 78' and switch 88' in series.

To this end, one contact of the switch mechanism 184 is connected to the main power lead 210 as by a lead 248, while the other contact is connected to one contact of each of the switches 88 and 88', as by leads 250 and 252. The other contact of the switch 88 is connected to the main ground lead 218 in series with the motor 78, as by leads 254 and 256. In like manner, the other contact of the switch 88' is connected to the main ground lead 232 in series with the motor 78', as by leads 258 and 260. A constant source of current to energize the 7-day clock 172 is provided by a pair of leads 262 and 264 connected to the main power lead 210 and to the main ground lead 218, respectively.

Automatic operation

Referring now more particularly to FIGURE 8 there is shown therein a graph which illustrates a recommended program of wet and dry bulb temperature variations per unit time which the apparatus 10 of the present invention is operable to maintain in the curing air to effect substantially the entire curing procedure automatically by the operation of control mechanism 18 of the present invention. In the program illustrated, the on-trippers 180 are preset on the dial 174 opposite the hour indicia indicating the following: 160 hours; 10 hours; 40 hours; 60 hours; and 74 hours. The off-trippers 182 are adjusted along the dial 174 at the following positions: 0 hours; 14 hours; 44 hours; 68 hours; and 108 hours. Prior to the loading of the leaves within the barn structure 12, dials 72 and 72' are turned back to a temperature below the outside temperature (presumed to be 82° in the graph as shown) so that valve 56 will remain closed and the dial 72' is likewise turned down to a value below the outside temperature so that the dampers will remain open. The timing dial 174 is set at a value a few hours preceding 160 hours as, for example, 156. In this condition, the main switch controlled fuse box 192 may be thrown to energize the fan motor 50. The circulation of air within the curing compartments in this fashion during loading aids in removing excess moisture from the leaves at outside temperatures.

The operation of the automatic control mechanism is commenced after the following preselections as adjustments have been made. The temperature dial 72 is adjusted to a setting to correspond with that of the outside temperature, thus firing the heating means 38. The maximum temperature adjustment knob 90 is set at a value of 170° and the advance adjustment knob 80 is set to provide for an increase in the setting of the dial 72 of 1½° temperature rise per hour. The relative humidity dial 72' is advanced to a value as, for example, 89°, above the outside temperature to insure that the damper means 70 will close. The maximum wet bulb temperature adjustment knob 90' is adjusted to a temperature of 110° and the rate of advance knob 80' is adjusted to provide for an advance of ½° per hour. The operator then commences automatic operation by turning the timing dial 174 until 160 hours is indicated by the pointer 178, at which time on-tripper 180 at the 160-hour position closes switch 185 so as to energize the advancing motors 78 and 78'.

In the graph shown in FIGURE 8, the actual curing procedure is indicated to start at zero hours, which in the program illustrated will be 8 hours after automatic operation has been commenced. During this initial 8-hour period, the curing air is brought to a temperature above that of the outside air and the relative humidity of the curing air will be something less than fully saturated, the outside moisture from the leaves having been completely removed.

At zero hours, off-tripper 182 opens switch mechanism 184 which deenergizes the temperature and humidity advance motors 78 and 78'. As shown, at zero hours, the setting of the temperature dial 72 is at 94° while the setting of the humidity dial 72' is at 92°. This setting marks the beginning of the yellowing step of the curing process, which is characterized by relatively low temperature and relatively high humidity conditions within the curing air. In the program illustrated, the curing air is maintained at a dry bulb temperature of 94° and a wet bulb temperature of 92° through the operation of the control units 54 and 58 in the manner previously described for a period of 10 hours. At 10 hours, the next on-tripper 180 on the timing dial 174 serves to close the switch mechanism 184 which energizes the temperature and humidity advance motors 78 and 78'. During the next time interval of 4 hours, in the illustrative program shown, the temperature dial is advanced at the preselected rate of 1½° per hour to a temperature of 100° and the humidity dial 72' is advanced at the preselected rate of ½° per hour to a wet bulb temperature of 94°. At 14 hours, the next off-tripper 182 serves to open the switch mechanism 184 to deenergize the temperature and humidity advance motors 78.

For the next time interval of 36 hours, in the illustrative program shown, the control units 54 and 58 maintain the curing air at a dry bulb temperature of 100° and at a wet bulb temperature of 94°. At 40 hours, the next on-tripper 180 serves to close switch mechanism 184 which again energizes the temperature and humidity advance motors 78 and 78'. For the next time interval of 4 hours in the illustrative program shown, the setting of the temperature dial 72 is advanced at the preset rate of 1½° per hour to a temperature of 106° and the wet bulb temperature is advanced at the preset rate of ½° per hour to a value of 96°. At 44 hours, the next off-tripper 182 serves to open the switch mechanism 184 to deenergize the temperature and humidity advance motors 78 and 78'. The control units 54 and 58 are thus operative to control the heating means and damper means to maintain a dry bulb temperature of the curing air at 106° and a wet bulb temperature of 96° for a time interval of 16 hours in the illustrative program shown to complete the yellowing step.

At 60 hours, the next on-tripper 180 serves to close the switch mechanism 184 and again energize the temperature and humidity advance motors 78 and 78' so as to commence the leaf drying step which is characterized by intermediate temperature and intermediate humidity conditions. In the illustrative program shown, the advance of the settings of the temperature dial 72 and humidity dial 72' is carried out for an initial interval of 8 hours at the end of which time the temperature dial 72 is at a setting of 118° and the humidity dial 72' is at a setting of 100° wet bulb temperature. At 68 hours the next off-tripper 182 serves to open the switch mechanism 184 to deenergize the temperature and humidity advance motors 78 and 78' so that the control units 54 and 58 will maintain the dry bulb and wet bulb temperature conditions constant for a time interval of 6 hours in the illustrative program shown. At the end of this time interval, the tobacco should be completely wilted.

At 74 hours the next on-tripper 180 serves to close the switch mechanism 184 to again energize the temperature and humidity advance motors 78 and 78'. The leaf drying step of the curing process is completed in the next time interval of 34 hours in the illustrative program shown, during which time the setting of temperature dial 72 is continuously advanced at the preset rate of 1½° per hour. It will be noted, however, that after 20 hours of operation (i.e. at 94 hours) the setting of the humidity dial 72 will have been advanced to its maximum setting of 110° at which time limit switch 88' is opened to prevent further energization of the humidity advance motor 78'. From this point on the wet bulb temperature is maintained at a constant value of 110° through the operation of the control unit 58. During the last 14 hours of the leaf drying step when the dry bulb temperature is advanced while the wet bulb temperature is maintained at a constant value, the relative humidity of the curing air is progressively reduced.

At 108 hours the last off-tripper 182 serves to open the switch mechanism 184 to complete the leaf drying step of the curing process. It will be noted that the dry bulb temperature at this point has advanced to a value of 170° which is the setting of the maximum temperature adjustment knob 90 so that limit switch 88 is likewise opened at this time to prevent further energization of the temperature advance motor 78. The operation continues under the control of units 54 and 58 for a time interval sufficient to complete the stem drying step which is characterized by relatively high temperature and relatively low humidity conditions.

In the illustrative program shown, the time interval of the stem drying step is 24 hours. At the end of this period (132 hours by the timing dial 174) the temperature dial 72 and humidity dial 72' are turned back to shut off the heating means and open the dampers. The fan motor 50 remains energized so that with the dampers fully opened, a rapid cooling of the curing air will take place. In the illustrative program shown, the temperature drops from the maximum of 170° to a value of 87° in a 1-hour period. At this point (133 hours as indicated on the timing dial 174), water may be added to the system to insure a more rapid increase in the moisture content of the leaves to decrease the time interval necessary to properly order the leaves for handling after the stem drying step has been completed. In the illustrative program shown, final ordering is accomplished in a 6-hour period (139 hours as indicated on the timing dial 174) at which point the main switch controlled fuse box 192 is thrown to deenergize the fan motor 50.

It can thus be seen that the apparatus 10 of the present invention provides for a complete cure of tobacco supported within the barn structure in bulk condition (or conventionally if desired) which is totally automatic from the start of the process to the end of the stem drying step of the process. The automatic control mechanism 18 provides for complete flexibility in the selection of the curing program which is carried out automatically. Thus, the present control mechanism provides for selection of any desired advance rate either in the temperature control unit 54 or the humidity control unit 58 by adjustment of knobs 80 and 80' and complete flexibility in the selection of the time intervals during which advance of the temperature control setting or humidity control setting takes place, as by adjustment of on-trippers 180 and off-trippers 182. Moreover, there is provided adjustment for the maximum dry bulb temperature to be maintained as well as the maximum temperature to be maintained, as by adjustment of knobs 90 and 90'. With this flexibility any one of the three steps may be preselected to involve any number of different time intervals in which the temperature and humidity dials are advanced or maintained at a constant value. For example, in the illustrative program shown, the preyellowing and yellowing step involves three separate and distinct time intervals of temperature and humidity advance and two intervening time intervals of constant temperature and humidity conditions. The operator is thus able to preselect a program which will fit the particular variety of tobacco which he is curing and to fit the particular outside air conditions at the particular locality where the cure takes place. Moreover, the system is susceptible to manual adjustment, during operation, as an added safety factor.

It will be understood that while the arrangement described in detail above is preferred, other conventional temperature and humidity sensing devices may be used.

For example, as shown in FIGURE 9 a dry bulb temperature sensing element 94' is utilized in lieu of the wet bulb temperature sensing element 94 to provide control of the damper means. The dry bulb temperature sensing element 94' however, would have to be mounted above the tobacco to provide a differential temperature reading with respect to the dry bulb temperature sensing element 66 below the tobacco. In FIGURE 8, such a dry bulb temperature line has been shown in the graph in phantom, the knob 80' being adjusted to advance the temperature one degree per hour. It will also be understood that humidity conditions may be sensed directly as by a humidistat or the like in which case the humidity line decreases from the start of the cure to the end thereof, necessitating a control unit in which the setting is decreased rather than advanced.

It will also be understood that while a fully automatic system such as described above is preferred, an important aspect of the present invention over known prior art devices lies in the provision of automatic control of the relative humidity conditions. Consequently, it is within the scope of the present invention to provide such automatic relative humidity control to the extent that the damper means is automatically operated to maintain relative humidity conditions which are set either manually or automatically in response to time conditions.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles.

What is claimed is:

1. Apparatus for bulk curing tobacco comprising: a barn structure having means defining a path for the circulation of air including curing compartment means within said path, a plurality of bulk curing racks for supporting a multiplicity of tobacco leaves in initially compressed bulk form within said curing compartment means for curing by contact with the air circulating in said path, fan means within said path for establishing and maintaining a forced circulating flow of air in said path in contact with tobacco leaves supported therein, damper means within said path for controlling the introduction of outside air into said path to be circulated therein and the discharge of circulating air from said path to the atmosphere to thereby vary the relative humidity of the circulating air contacting the tobacco leaves supported within said curing compartment means by said bulk curing racks, heating means within said path for applying heat to the air circulated in said path to thereby vary the temperature of the circulating air contacting the tobacco leaves supported within said curing compartment means by said bulk curing racks, and temperature, relative humidity, and time responsive automatic control means for effecting operation of said heating means and said damper means to establish in continuous sequence low temperature and high relative humidity conditions in the circulating air contacting the tobacco leaves supported within said curing compartment means by said bulk curing racks for a time interval sufficient to color the leaves, intermediate temperature and relative humidity conditions in the circulating air contacting the tobacco leaves supported within said curing compartment means by said bulk curing racks for a time interval sufficient to dry the leaves, and high temperature and low humidity conditions in the circulating air contacting the tobacco leaves supported within said curing compartment means by said bulk curing racks for a time interval sufficient to dry the stems of the leaves.

2. Apparatus as defined in claim 1 wherein said automatic control means includes means movable into desired preselected positions of adjustment for varying the continuous sequence of operation with respect to the rate of temperature increase, the rate of humidity decrease and the time intervals during which the temperature is maintained constant and increased at the preselected rate and during which the humidity is maintained constant and decreased at the preselected rate.

3. Apparatus as defined in claim 1 wherein said damper means includes:

fresh air inlet damper means movable between opened and closed positions, and normally closed exhaust damper means spaced from said inlet damper means movable into an opened position to discharge air in said path to the atmosphere in response to an increase in the pressure conditons of the air adjacent thereto resulting from the introduction of fresh air through said inlet damper means, and wherein said automatic control means includes:

means for moving said inlet damper means between said opened and closed positions, and a humidity control unit for actuating said moving means to open and close said inlet damper means to maintain the actual operating relative humidity of the curing air generally at a desired relative humidity.

4. Apparatus as defined in claim 3 wherein said automatic control means further includes:

a temperature control unit for operating said heating means to maintain the actual operating temperature of the curing air prior to contact with the tobacco leaves generally at a desired temperature, each of said control units including means for changing the respective desired relative humidities and temperatures at which said control units are operable to maintain the respective actual operating relative humidities and temperatures, and a timing unit for controlling the operation of said desired relative humidity and temperature changing means.

5. Apparatus as defined in claim 4 in wherein each of said control units further includes means for adjusting the rate of relative humidity and temperature change at which the respective desired operating relative humidity and temperature changing means are operable.

6. Apparatus for establishing and maintaining a controlled flow of air through a multiplicity of tobacco leaves or the like supported in a curing structure comprising:

a housing having an inlet adapted to be communicated with the interior of the curing structure, an outlet adapted to be communicated with the interior of the curing structure and means defining a path of air flow from said inlet to said outlet, fan means carried by said housing within said path for establishing and maintaining a forced flow of air from said inlet through said path and out said outlet for passage into the interior of the curing structure and through the tobacco leaves supported therein, damper means carried by said housing in communication with said path movable to control the introduction of outside air into said path to thereby vary the relative humidity of the flowing air contacting the tobacco leaves supported within the barn, heating means carried by said housing within said path for applying heat to the air in said path to thereby vary the temperature of the flowing air contacting the tobacco leaves supported within the barn, and temperature, relative humidity, and time responsive automatic control means for effecting operation of said heating means and said damper means to establish in continuous sequence a low temperature and high relative humidity condition in the flowing air contacting the leaves supported within the barn for a time interval sufficient to color the leaves, intermediate temperature and relative humidity condition in the circulating air contacting the leaves supported within the barn for a time interval sufficient to dry the leaves, and high temperature and low relative humidity condition in the circulating air contacting the leaves supported within the barn for a time interval sufficient to dry the stems of the leaves.

7. Apparatus as defined in claim 6 wherein said automatic control means includes:
 means for moving said damper means between relatively opened and closed positions, and
 a humidity control unit for actuating said moving means to open and close said damper means to maintain an actual operating temperature of the curing air different bearing a direct relationship to the relative humidity of the curing air generally at a desired temperature corresponding to a desired relative humidity.

8. Apparatus as defined in claim 7 wherein said automatic control means further includes:
 a temperature control unit for operating said heating means to maintain the actual operating temperature of the curing air prior to contact with the tobacco leaves generally at a desired temperature,
 each of said control units including means for advancing the respective desired temperatures at which said control units are operable to maintain the respective actual operating temperatures, and
 a timing unit for controlling the operation of said desired temperature advancing means.

9. Apparatus as defined in claim 8 wherein each of said control units further includes means for adjusting the rate of temperature advance at which the respective desired temperature advancing means are operable.

10. Apparatus for controlling air conditions in a tobacco curing barn of the type wherein a multiplicity of tobacco leaves or the like are adapted to be supported within the path of heated air flow for curing by contact of the heated air therewith comprising:
 damper means movable to control the introduction of outside air into the heated air flowing in said path to thereby vary the relative humidity of the heated air contacting the tobacco leaves supported within said path,
 moving means operatively connected with said damper means for effecting movement of said damper means to vary the relative humidity conditions,
 wet bulb thermometer means for sensing the wet bulb temperature of the heated air flowing in said path, thermostat means operatively connected with said wet bulb thermometer means and said moving means operable in response to the actual operating wet bulb temperature sensed by said wet bulb thermometer means for effecting operation of moving means to maintain the actual operating wet bulb temperature substantially at a desired operating wet bulb temperature, and
 wet bulb temperature advancing means operatively connected with said thermostat means for increasing at a predetermined rate the desired operating wet bulb temperature at which said thermostat means maintains the actual operating wet bulb temperature through operation of said moving means in response to the sensing of said wet bulb thermometer means.

11. Apparatus as defined in claim 10 including timing means operatively connected with said wet bulb temperature advancing means for actuating said wet bulb temperature advancing means at predetermined times to increase the desired operating wet bulb temperature at said predetermined rate and for deactuating said wet bulb temperature advancing means at predetermined times to maintain a constant desired operating wet bulb temperature.

12. Apparatus as defined in claim 11 including means operatively connected with said wet bulb temperature advancing means for deactuating said wet bulb temperature advancing means in response to the increase of the desired operating wet bulb temperature to a predetermined desired maximum operating wet bulb temperature.

13. Apparatus as defined in claim 12 including means for varying the predetermined maximum operating wet bulb temperature at which said maximum temperature responsive deactuating means is operable to deactuate said wet bulb temperature advancing means.

14. Apparatus as defined in claim 13 including means operatively connected with said wet bulb temperature advancing means for varying the predetermined rate at which the desired operating wet bulb temperature is increased by said wet bulb temperature advancing means.

15. A control mechanism as defined in claim 11 wherein said timing means includes manually operable means for selectively varying the predetermined times at which said wet bulb temperature advancing means is actuated and deactuated by said timing means.

16. Apparatus as defined in claim 10 including:
 dry bulb thermometer means for sensing the dry bulb temperature of the air flowing in said path prior to contact with the tobacco leaves,
 second thermostat means operatively connected with said dry bulb thermometer means operable in response to the actual operating dry bulb temperature sensed by said dry bulb thermometer means for effecting operation of heating means for the air flowing in said path to maintain the actual operating dry bulb temperature substantially at a desired dry bulb temperature, and
 dry bulb temperature advancing means operatively connected with said second thermostat means for increasing at a predetermined rate the desired operating dry bulb temperature at which said second thermostat means maintains the actual operating dry bulb temperature in response to the sensing of said dry bulb thermometer means.

17. Apparatus as defined in claim 16 including timing means operatively connected with said wet bulb temperature advancing means and said dry bulb temperature advancing means for simultaneously actuating said wet bulb temperature advancing means and said dry bulb temperature advancing means at predetermined times to increase the desired operating wet and dry bulb temperatures at said predetermined rates and for deactuating said wet bulb temperature advancing means and said dry bulb temperature advancing means simultaneously at said predetermined times to maintain constant desired operating wet and dry bulb temperatures.

18. Apparatus as defined in claim 17 including means operatively connected with said wet bulb temperature advancing means for deactuating said wet bulb temperature advancing means in response to the increase of the desired operating wet bulb temperature to a predetermined desired maximum operating wet bulb temperature.

19. Apparatus as defined in claim 18 including means operatively connected with said dry bulb temperature advancing means for deactuating said dry bulb temperature advancing means in response to the increase of the desired operating dry bulb temperature to a predetermined desired maximum operating dry bulb temperature.

20. Apparatus as defined in claim 19 including means for varying the predetermined maximum operating wet bulb temperature at which said maximum wet bulb temperature responsive deactuating means is operable to deactuate said wet bulb temperature deactuating means and means for varying the predetermined maximum operating dry bulb temperature at which said maximum dry bulb temperature responsive deactuating means is operable to deactuate said dry bulb temperature deactuating means.

21. Apparatus as defined in claim 20 wherein said timing means includes manually operable means for selectively varying the predetermined times at which said wet bulb temperature advancing means and said dry bulb temperature advancing means are actuated and deactuated by said timing means.

22. Apparatus as defined in claim 21 including means operatively connected with said wet bulb temperature advancing means for varying the predetermined rate at which the desired operating wet bulb temperature is increased by said wet bulb temperature advancing means.

23. Apparatus as defined in claim 22 including means operatively connected with said dry bulb temperature advancing means for varying the predetermined rate at which the desired operating dry bulb temperature is increased by said dry bulb temperature advancing means.

24. Apparatus for establishing asd maintaining a controlled flow of air through a multiplicity of tobacco leaves or the like supported in a tobacco barn comprising:
a housing having an inlet adapted to be connected with the interior of the barn,
an outlet adapted to be communicated with the interior of the barn and means defining a path of air flow from said inlet to said outlet,
fan means carried by said housing within said path for establishing and maintaining a forced flow of air from said inlet through said path and out said outlet for passage into the interior of the barn and through the tobacco leaves supported therein,
heating means carried by said housing within said path for applying heat to the air in said path to thereby vary the temperature of the flowing air contacting the tobacco leaves supported within the barn,
thermometer means for sensing the temperature of the air flowing in the interior of the barn prior to contacting the tobacco leaves supported therein,
thermostat means operatively connected with said thermometer means operable in response to the actual operating temperature sensed by said thermometer means for effecting operation of said heating means to maintain the actual operating temperature substantially at a desired temperature,
temperature advancing means operatively connected with said thermostat means for increasing at a predetermined rate the desired operating temperature at which said thermostat means maintains actual operating temperature in response to the sensing of said thermometer means,
and timing means operatively connected with said temperature advancing means for actuating said temperature advancing means at predetermined times to increase the desired operating temperature at said predetermined rate and for reactuating said temperature advancing means at predetermined times to maintain a constant desired operating temperature.

25. Apparatus for bulk curing tobacco comprising:
a barn structure having means defining a path for the circulation of air including curing compartment means within said path,
a plurality of bulk curing racks for supporting a multiplicity of tobacco leaves in initially compressed bulk form within said curing compartment means for curing by contact with the air circulating in said path,
fan means within said path for establishing and maintaining a forced circulating flow of air in said path in contact with togacco leaves supported therein,
heating means within said path for applying heat to the air circulated in said path to thereby vary the temperature of the circulating air contacting the tobacco leaves supported within said curing compartment means by said bulk curing racks,
damper means within said path for controlling the introduction of outside air into said path to be circulated therein and the discharge of circulating air from said path to the atmosphere to thereby vary the relative humidity of the circulating air contacting the tobacco leaves supported within said curing compartment means by said bulk curing racks,
moving means operatively connected with said damper means for effecting movement of said damper means to vary the relative humidity of the heated air flowing in said path,
means for sensing a condition of the heated air flowing in said path indicative of relative humidity,
control means operatively connected with said sensing means and said moving means operable in response to the actual condition indicative of relative humidity sensed by said sensing means for effectiing operation of said moving means to maintain the actual operating relative humidity substantially at a desired operating relative humidity, and
means operatively connected with said control means for reducing the desired operating relative humidity at a predetermined rate at which said control means is operable to maintain the actual operating relative humidity by effecting operation of said moving means in response to the actual condition indicative of relative humidity sensed by said sensing means.

26. Apparatus as defined in claim 25 wherein said last mentioned means includes means for adjusting the predetermined rate at which the desired operative relative humidity is reduced.

27. Apparatus for bulk curing tobacco comprising:
a barn structure having means defining a path for the circulation of air including curing compartment means within said path,
a plurality of bulk curing racks for supporting a multiplicity of tobacco leaves in initially compressed bulk form within said curing compartment means for curing by contact with the air circulating in said path,
fan means within said path for establishing and maintaining a forced circulating flow of air in said path in contact with tobacco leaves supported therein,
heating means within said path for applying heat to the air circulated in said path to thereby vary the temperature of the circulating air contacting the tobacco leaves supported within said curing compartment means by said bulk curing racks,
damper means within said path for controlling the introduction of outside air into said path to be circulated therein and the discharge of circulating air from said path to the atmosphere to thereby vary the relative humidity of the circulating air contacting the tobacco leaves supported within said curing compartment means by said bulk curing racks,
moving means operatively connected with said damper means for effecting movement of said damper means to vary the relative humidity of the heated air flowing in said path,
first dry thermometer means for sensing the temperature of the air flowing in said path just before contacting the tobacco leaves supported within said curing compartment means by said bulk curing racks,
first thermostat means operatively connected with said first thermometer means operable in response to the actual operating temperature sensed by said first thermometer means for effecting operation of said heating means to maintain the actual operating temperature sensed by said first thermometer means substantially at a desired temperature,
second dry thermometer means for sensing the temperature of the air flowing in said path just after contacting the tobacco leaves supported within said curing compartment means by said bulk curing racks, and
second thermostat means operatively connected with said second thermometer means operable in response to the actual operating temperature sensed by said second thermometer means for effecting operation of said moving means to maintain the actual operating temperature sensed by said second thermometer means at a desired temperature.

(References on following page)

References Cited

UNITED STATES PATENTS

| | | | |
|---|---|---|---|
| 1,339,373 | 5/1920 | Buensod | 34—46 XR |
| 1,339,374 | 5/1920 | Buensod | 34—46 XR |
| 1,863,943 | 6/1932 | Rubin | 34—46 XR |
| 2,184,473 | 12/1939 | Scanlan | 34—46 |
| 3,110,326 | 11/1963 | Hassler | 131—140 |
| 3,134,583 | 5/1964 | Wilson. | |
| 3,203,265 | 8/1965 | Flegel | 236—46 XR |

MARK M. NEWMAN, Primary Examiner

ALLAN D. HERRMAN, Assistant Examiner

U.S. Cl. X.R.

34—46, 53; 131—135; 236—44, 46; 263—19